No. 751,234. PATENTED FEB. 2, 1904.
W. N. WHITELY.
SAFETY APPLIANCE FOR LOCOMOTIVE ENGINES OR MOTOR VEHICLES.
APPLICATION FILED MAR. 24, 1903.
NO MODEL. 6 SHEETS—SHEET 1.
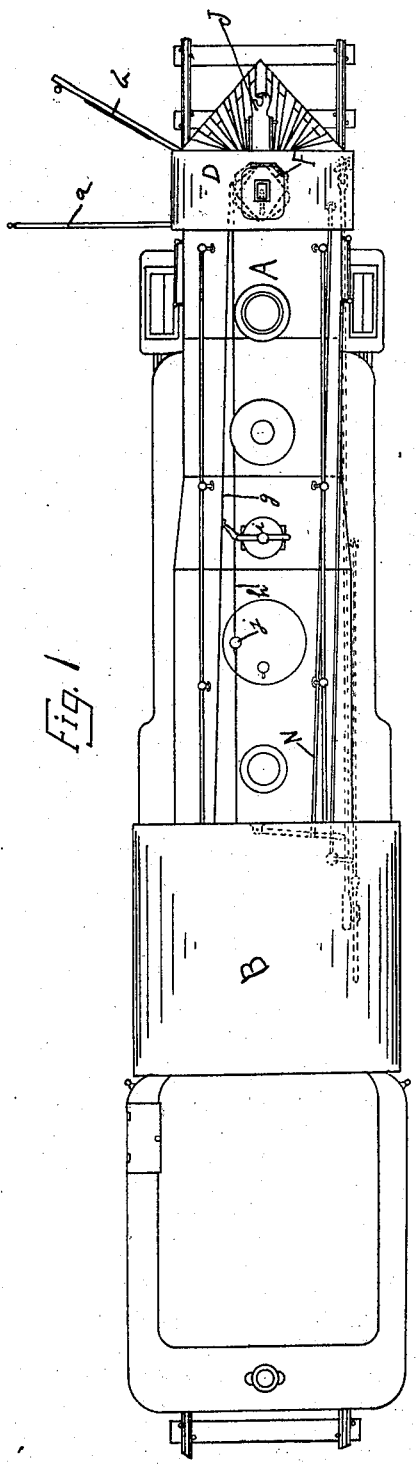
WITNESSES:
INVENTOR.

No. 751,234. PATENTED FEB. 2, 1904.
W. N. WHITELY.
SAFETY APPLIANCE FOR LOCOMOTIVE ENGINES OR MOTOR VEHICLES.
APPLICATION FILED MAR. 24, 1903.
NO MODEL. 6 SHEETS—SHEET 2.
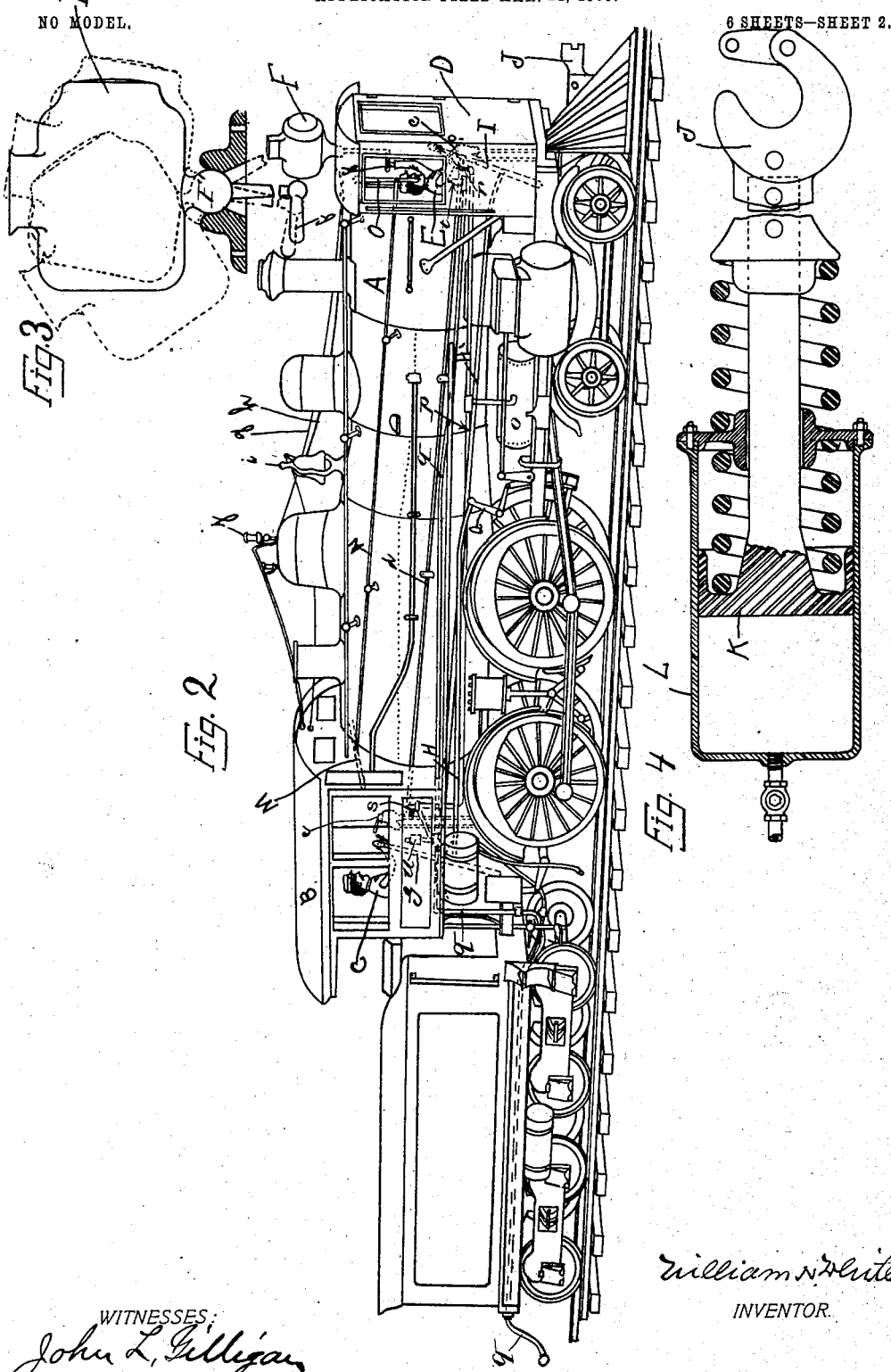

No. 751,234. PATENTED FEB. 2, 1904.
W. N. WHITELY.
SAFETY APPLIANCE FOR LOCOMOTIVE ENGINES OR MOTOR VEHICLES.
APPLICATION FILED MAR. 24, 1903.
NO MODEL. 6 SHEETS—SHEET 3.
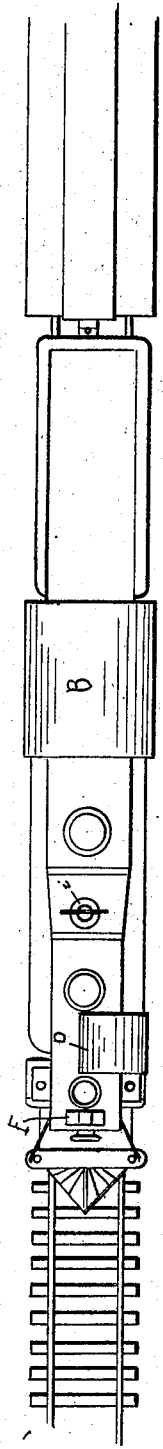
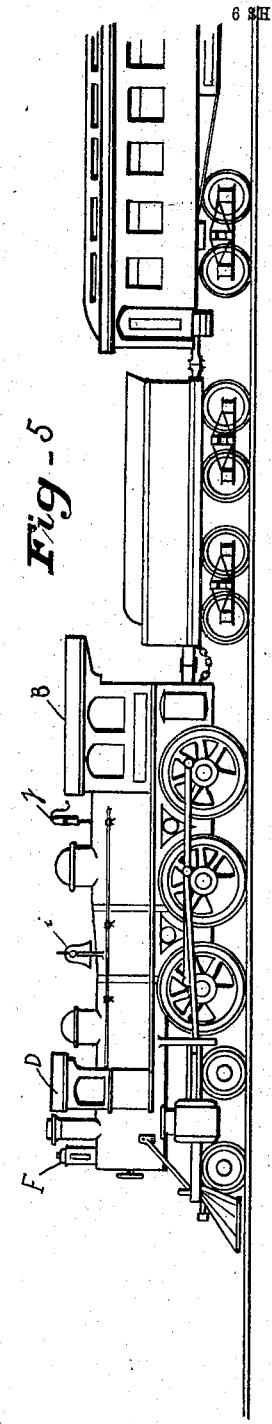
Witnesses
John L. Gilligan
Robert Weiskollen
Inventor
William N. Whitely No. 751,234. PATENTED FEB. 2, 1904.
W. N. WHITELY.
SAFETY APPLIANCE FOR LOCOMOTIVE ENGINES OR MOTOR VEHICLES.
APPLICATION FILED MAR. 24, 1903.
NO MODEL. 6 SHEETS—SHEET 4.
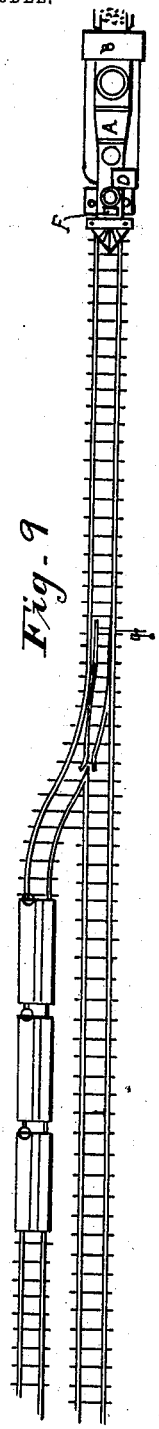
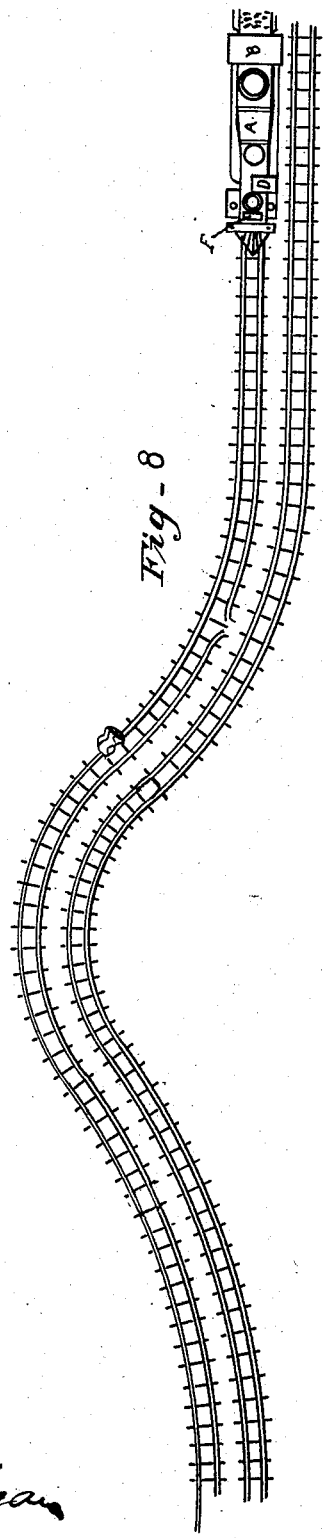
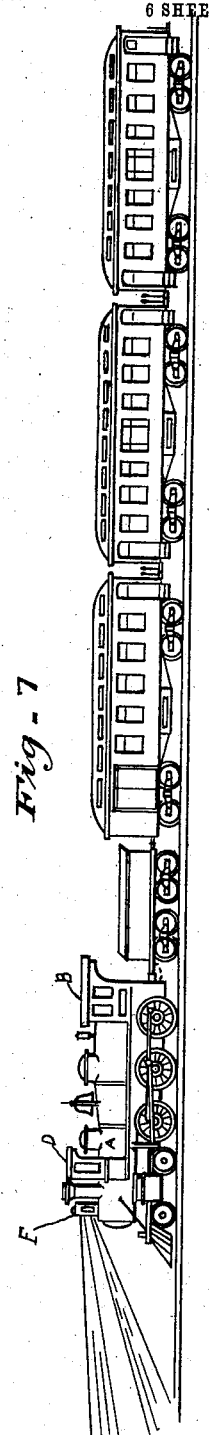

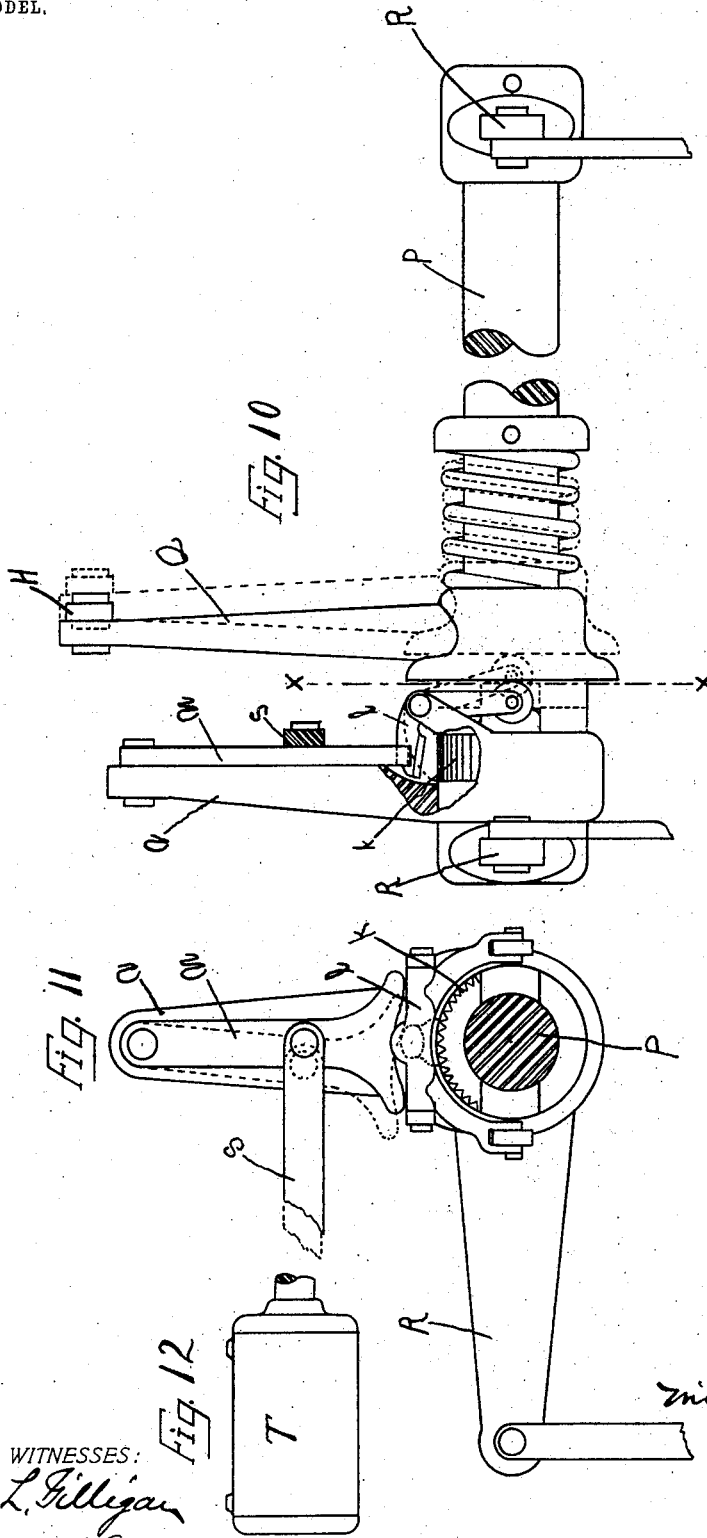

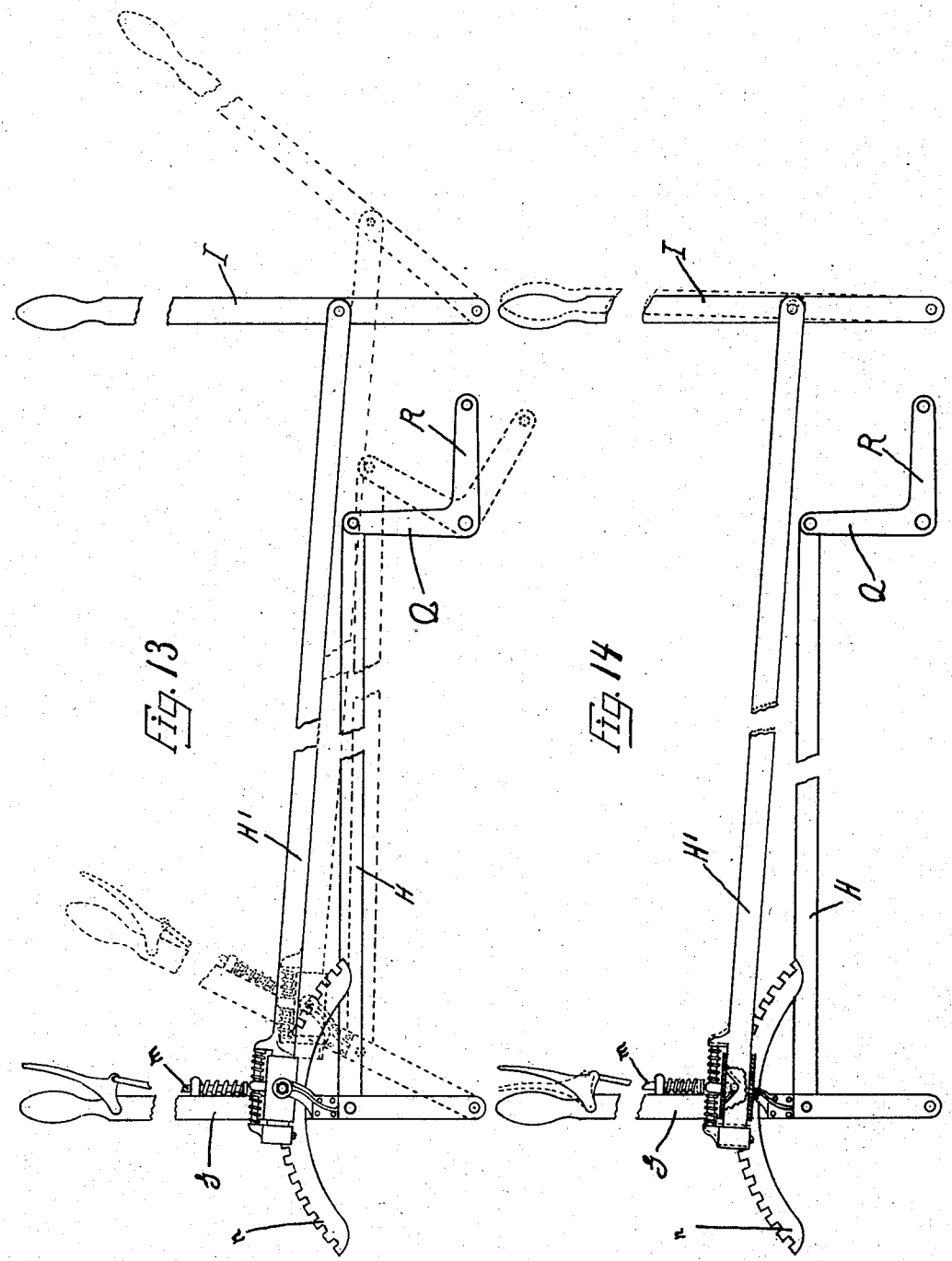

No. 751,234. Patented February 2, 1904.

UNITED STATES PATENT OFFICE.

WILLIAM N. WHITELY, OF SPRINGFIELD, OHIO.

SAFETY APPLIANCE FOR LOCOMOTIVE-ENGINES OR MOTOR-VEHICLES.

SPECIFICATION forming part of Letters Patent No. 751,234, dated February 2, 1904.

Application filed March 24, 1903. Serial No. 149,406. (No model.)

*To all whom it may concern:*

Be it known that I, WILLIAM N. WHITELY, a citizen of the United States, residing at No. 153 East High street, Springfield, in the county of Clark and State of Ohio, have invented certain new and useful Improvements in Safety Appliances for Locomotive-Engines or Motor-Vehicles, of which the following is a specification.

My invention relates to improvements in safety appliances for locomotive-engines or motor-vehicles.

One object of my invention is to provide a position for a pilot for the locomotive-engine or motor-vehicle independent from that of the general operator.

Another object of my invention is to provide the pilot with duplicate controlling mechanism for the locomotive-engine or motor-vehicle independent of the general operator.

A further object of my invention is to provide the pilot with the necessary means for controlling and operating the locomotive-engine or motor-vehicle independent of the general operator in case of emergency to avoid accidents to the locomotive-engine, motor-vehicle, or to the occupants of cars or coaches attached thereto.

A further object of my invention is that in emergency, wherein the general operator is not advised of the danger in time to prevent it or from his disability or by reason of his attention being directed in some other direction or his being engaged in caring for or operating the locomotive-engine or motor-vehicle the pilot stands ready and is fully prepared and equipped with the necessary means and appliances to stop the locomotive-engine or motor-vehicle and avoid loss of life and destruction of property from wrecks and disasters which would certainly occur were not these provisions made.

I attain these objects by the mechanism illustrated in the accompanying drawings, in which—

Figure 1 is a plan view of an ordinary locomotive-engine or motor-vehicle complete, such as is now in common use, and equipped with a position for a pilot stationed at the forward end, the general operator's position not being changed. Fig. 2 is a side elevation of same, showing the position for the pilot and the general operator of the locomotive-engine or motor-vehicle, also showing the connecting operating means for the pilot, which are substantially the same means as are employed by the general operator to start, stop, or reverse the motion of the locomotive-engine or motor-vehicle, to apply the air-brakes, blow the whistle, ring the bell, except that the pilot is provided with superior means over the general operator to forcibly control and operate the locomotive-engine or motor-vehicle independent of and against the will of the general operator, also showing the search-light and means for operating same by the pilot to direct the rays of same in advance of the locomotive-engine or motor-vehicle. Fig. 3 is a detail view of the search-light, the heavy lines showing the position of the search-light in its normal position throwing the rays straight ahead, the dotted lines showing the position of the search-light when it is desired to direct the rays downward or upward. Fig. 4 is a detail plan view, partly in section of the pneumatic bumper located in front of the locomotive-engine or motor-vehicle. Fig. 5 is a side elevation of a locomotive-engine, showing the pilot position located forward of the general operator and to one side of the boiler. Fig. 6 is a plan view of same. Fig. 7 is a side elevation of a locomotive-engine with train of cars or coaches attached passing over the track, the rays of the search-light directed on the track, so that the pilot may have a clear view of same. Fig. 8 is a plan view of a portion of a railroad-track, showing a broken rail and obstructions on the track ahead of the approaching train which were discovered by the pilot and the locomotive-engine stopped before reaching same and a wreck averted. Fig. 9 is a plan view of a portion of a main railroad-track with approaching trains and a side track with cars standing thereon, showing the switch misplaced which was discovered by the pilot and the train stopped before running into same, thus avoiding a wreck. Fig. 10 is a detail side elevation of the tumbling-shaft, tumbling-shaft lever, and tumbling-shaft arms, and means of disengaging from the reversing-lever and engaging with the reach-rod to the air-cylinder. Fig. 11 is a detail cross-section of Fig. 10, taken on the lines x x. Fig. 12 is a side elevation of the air-cylinder. Fig. 13 is a detail side elevation showing the reversing-lever mechanism for the general operator and connecting means to same from the reversing-lever for the pilot, the heavy lines showing the position of the lever when the motor-vehicle or locomotive-engine is moving at the speed desired, the dotted lines showing the position of the levers when the propelling mechanism is reversed to stop the motor-vehicle or locomotive-engine in case of emergency. Fig. 14 is a detail side elevation showing the reversing-lever mechanism and means of disengaging the locking mechanism for said lever by the pilot independent of the general operator.

Similar letters refer to similar parts throughout the several views.

In the drawings, A represents the boiler; B, the cab for the general operator; C, the general operator; D, the cab for the pilot; E, the pilot; F, the search-light; G, the reversing-lever for the general operator C. Pivotally connected to said lever G is the reach-rod H', which extends forward and connects to the reverse-lever I for the pilot E, the point of connection of said reach-rod H' to said lever I being such that the pilot E can operate and control said lever G independent of and against the will of the general operator.

H is the reach-rod extending from the reversing-lever G to the tumbling-shaft lever Q.

J is the coupler.

K is the piston to which said coupler is attached.

L is the air-cylinder for operating the piston K.

M is the throttle-lever.

N is the reach-rod extending from the throttle-lever M for the general operator to the the throttle-lever O for the pilot E. The connection of said reach-rod N to said lever O is such that the pilot E can in case of emergency operate the throttle-lever M independent of and against the will of said general operator.

P is the tumbling-shaft.

Q is the tumbling-shaft lever.

R R R are the tumbling-shaft arms.

S is the reach-rod extending from the air-cylinder T, located in the pilot-cab D, to the cam-lever U, which is pivoted to the upright arm V, which is mounted on the tumbling-shaft arm R, which has mounted on same within a certain radius teeth or notches $k$, that by the first action of the cam-lever U will operate the bell-crank $l$, which disengages the tumbling-shaft lever Q and engages the upright arm V to the tumbling-shaft arm R. Said disengaging and engaging mechanism construction (shown in Figs. 10, 11, and 12) may be operated by means of compressed air or other agencies as well as being manually operated.

The pilot E is provided with means to operate the search-light F, as shown in Figs. 2 and 3, and can direct the rays of said light in any direction desired, as shown in Figs. 1 and 3, so as to carefully examine the track ahead, taid light being connected to said cab D by a ball-and-socket or universal joint F', as shown in Figs. 2 and 3, the frictional contact between said joint F' and said cab D being such as to allow free movement in all directions, yet at the same time the frictional contact between the parts composing said joint F' is such that when said light F is once adjusted by said pilot E to any position desired it will, owing to the frictional contact between the parts composing said joint, remain in its adjusted position until changed to another position by said pilot E, thus obviating the necessity of the pilot E keeping his hand on the adjusting-lever for said search-light while in its adjusted position, but leaves him free to use same for other purposes. While operating said light said pilot can simultaneously operate the throttle-lever M and reversing-lever G, so as to promptly stop the motor-vehicle or locomotive-engine quickly in case of emergency or danger.

The cab D for the pilot E is provided with doors $a$ and $b$, as shown in Fig. 1, the former located in front of the pilot's position and the latter in rear of his position, so that said cab may be easy of ingress and egress and that free access may be had to the forward end of the boiler, if desired.

$c$ is the air-brake valve-lever for the general operator. $d$ is the air-pipe extending from the air-brake lever $c$ for the general operator C to the air-brake lever $e$ for the pilot E. $f$ is the adjusting-lever for the search-light F for the pilot E. $g$ is bell-cord extending from the bell $i$ to the pilot E. $h$ is the cord extending from the whistle $j$ to the pilot E, all of these connections extending to and terminating in the cab D within easy and convenient reach of the operator and can be operated by him when desired.

$o$ is the compressed-air tank, to which is connected the air-pipe $p$, which extends forward to the pilot E and rearward to the general operator C. On the forward end of said air-pipe $p$ in the cab D within easy reach of the pilot E is a lever $r$, and when said pilot E desires to communicate with the general operator C or with the conductor or trainmen in coaches (not shown) attached to and drawn by said locomotive-engine or motor-vehicle he operates the lever $r$, which opens the air-valve and sounds the whistle $t$, located in the cab D on the air-pipe $q$, and also sounds the whistle $s$ on said air-pipe $q$, located in the cab B for the general operator C. Said air-pipe $q$ extends rearwardly from said locomotive-engine or motor-vehicle and by means of flexible connections connects to and with each coach attached to and drawn by said locomotive-engine or motor-vehicle, so that when the pilot E sounds the whistle $r$ it also sounds the whistle $s$ in the cab B for the general operator and also sounds similar whistles in each of the coaches (not shown) attached to and drawn by said locomotive-engine or motor-vehicle, so that in whatever coach the conductor or trainmen may be they will be fully advised of the signal when communicated by the pilot E or general operator C. In case the general operator C desires to signal or communicate with the pilot E or with the conductor or trainmen he can do so by operating the lever $u$, located on the air-pipe $p$, which opens the air-valve and sounds the whistle $t$ in the cab D and also sounds similar whistles in each of the coaches (not shown) attached to or drawn by said locomotive-engine or motor-vehicle, so that at all times instantaneous communication may be had between the pilot E, general operator C, and conductor or trainmen in the coaches, (not shown,) and while I have shown but one means of communication between the pilot E, general operator C, conductor and trainmen, or occupants of the coaches (not shown) that may be attached to and drawn by said locomotive-engine or motor-vehicle it is evident that any other of the well-known means of cummunication or signaling between the pilot E, general operator C, and trainmen or occupants may be employed—such as steam-whistles, telephones, speaking-tubes, electric bells, &c.—and come within the scope of my invention.

Referring to Figs. 13 and 14, when the pilot E desires to reverse the motor-vehicle or locomotive-engine against the will of the general operator he moves the lever G, as shown in Fig. 14, which releases the plunger $m$ from engagement with the plunger or lock $n$, which then enables said pilot E to move and operate said lever G forward or backward, as desired, for stopping, starting, or reversing the motor-vehicle or locomotive-engine, as desired.

While I have shown a locomotive-engine of the kind now in common use and which is equipped with air-brake mechanism, &c., for the engine and coaches attached, yet any other motor-vehicle is contemplated in my improvements, and the well-known construction of motor-vehicles or locomotive-engines are applicable to be used with my improved safety appliances, and my improvements are not confined to any particular kind or class of locomotive-engines or motor-vehicles.

Since the introduction of modern appliances to locomotive-engines or motor-vehicles—such as steam-heating of the cars, mechanism for supplying and operating the air for the brakes and whistle, handling the electric current, electric head-lights, signals, and running a portion of the mechanism while the motor-vehicle is at rest—have so increased the cares and duties of the general operator that he has but little time to look ahead for danger that he may be approaching or that may lie before him, therefore a pilot or lookout for the safe running of the locomotive-engine or motor-vehicle or train is necessary, the duty of the pilot being first to look out for danger and to have such appliances in emergency within his control as to avoid it.

Owing to the heavy and increasing traffic on railways at the present time and the rapid rate at which trains are now being run in order to reach their destination on schedule time, the general operator's time is almost entirely occupied in looking after and caring for the motor-vehicle or locomotive-engine in his charge to keep it in order, and as his location on said motor-vehicle or locomotive-engine is such that a clear and unobstructed view of the track for any considerable distance ahead cannot be had, and too much is required of him, even if it were possible to foresee many accidents occur in consequence that could be averted, and serious loss to life and property is the result, and to overcome and prevent such accidents and run the motor-vehicles or locomotive-engines safer and better is the primary object of my invention. To accomplish this result, I employ a pilot so located on the motor-vehicle or locomotive-engine where he has a clear and unobstructed view of the track for a long distance ahead at all times by day and by night, and he is provided with many appliances, such as powerful field-glasses, to readily detect in advance of the motor-vehicle or locomotive-engine any obstructions on the track, broken rails, open or misplaced switches, washouts, broken or burned bridges, spreading rails, other trains in advance on the same track and moving in the same direction which have been delayed by accident or from other causes between stations with no means of telegraphic communication, or trains approaching each other on the same track, train robbers or wreckers. Said pilot is provided for use at night with a powerful flash or search light under his control, which is located on the motor-vehicle or locomotive-engine, the rays of which he can direct either straight ahead or to either side of the track or up and down, so as to carefully and thoroughly scan the track and surroundings for a long distance ahead and have appliances under his control to stop the motor-vehicle or locomotive-engine before running into such danger, or to reverse its direction, apply the brakes, and signal the engineer, conductor, or trainmen; but so long as the pilot discovers no danger ahead and has a clear view of the track for a considerable distance ahead he takes no action as to operating or controlling the train, but allows the train to move along, but he warns the general operator by proper signals of approaching crossings, &c. After the pilot has taken the locomotive-engine, motor-vehicle, or train a certain distance and as far as it would be deemed safe or advisable without rest he is replaced by another one, similar to the plan adopted for engineers, conductors, or other trainmen in order that perfect protection may be afforded the passengers and the property of the railroad company.

By providing a pilot for a locomotive-engine or motor-vehicle in addition to a general operator it will be observed that at no time and under no circumstances would it be necessary for both the pilot and the general operator to leave their positions on the locomotive-engine or motor-vehicle at the same time. There are times when the general operator is called from his post of duty to care for the locomotive-engine or motor-vehicle in his charge, and in that event the pilot is to remain at his post and be the safeguard of the train. Both the pilot and general operator are to receive similar telegraphic orders as to running the train, &c.

The duty of the pilot is first to carefully scan the track and adjacent territory in advance of the locomotive-engine or motor-vehicle and when on a straight track and all is clear for a considerable distance in advance that he can signal the general operator of the locomotive-engine or motor-vehicle accordingly by means at his command that the speed can be safely accelerated, and as the locomotive-engine or motor-vehicle is nearing sharp curves or dangerous places in the road and on account of the curvature of the track or on account of fogs, blinding snow-storms, or other reasons the pilot is unable to obtain a clear view of the track for any considerable distance ahead and to guard against and avoid the possibility of head-end collisions or other accidents the pilot can signal the general operator of the locomotive-engine or motor-vehicle to slow down until the curve is rounded or until a clear view of the track for a considerable distance ahead can be had, when he signals the general operator that the speed may be increased, and so take every advantage to speedily and safely run the train.

At night the pilot is provided with signals, such as rockets, which he can explode high in the air to notify trains that may be approaching on the same track, or by day floating signals can be used that will remain up a short time, and he can also direct the rays of the flash-light above the horizon as a further warning to approaching trains, and in case danger is discovered ahead from any cause the pilot is provided with superior and powerful means to stop the motor-vehicle or locomotive-engine independent of the general operator and without his knowledge or consent, so that the general operator cannot thwart the will of the pilot, thereby avoiding contention and misunderstanding between them; but they are only to be used by said pilot in emergencies to prevent accidents when a moment's loss of time is important. The pilot is not intended to assume the running or operating of the motor-vehicle or locomotive-engine, but to act with the greatest promptness when any delay might be fatal.

The principle on which my safety railway-train or any motor-vehicle is operated, whether singly or drawing other vehicles, is to provide separate and independent means for the pilot from those used by the general operator of the motor-vehicle or locomotive-engine—that is, a person whose duty is to look forward and backward by means of reflectors to see whether or not any other vehicle on a common road or railway-track is about to cross the track on which his train is moving or any train coming in front or in rear of said piloted train or to discover any obstacle upon the track. Said pilot is also provided with means to signal the approaching trains in any direction or to notify persons about to cross the tracks and provided with means within his reach, independently of the engineer, trainmen, conductor, or any other person or party, substantially the same as the general operator is provided with, but superior in power, that the general operator cannot hold against the action of said pilot, so that in case of emergency he may quickly stop the train, start it, or reverse its movements, and in any other way control it as fully and entirely as the general operator otherwise could have done and against the will of the general operator, if necessary.

While the position for the pilot may be at any point on the motor-vehicle or locomotive-engine where he can have a clear and unobstructed view of the track ahead, I prefer to station the pilot in a suitable cab located in advance of the boiler or driving mechanism of the motor-vehicle or locomotive-engine and to use a pneumatic bumper located just ahead of said pilot, suitable provision being made to keep the windows of said cab clean and free from snow, ice, frost, or any other substance that might obstruct his view, so as not to interfere with or obstruct the pilot from seeing in all directions. It is also desirable that the position of the pilot be so located and arranged as not to interfere with the running of the motor-vehicle by the general operator.

It is not thought necessary to go into the details of the causes of motor-vehicle accidents and wrecks, commonly called "railway-wrecks," as the causes are numerous, such as broken rails, open or misplaced switches, obstructions on the track, other trains crossing in front of the moving train herein spoken of, trains approaching on the same track, rearend collisions, persons or vehicles crossing the track, &c.

Much has been said about luxurious trains for travel by rail, and much time and money have been expended to make railroad traveling attractive; yet but little advancement has been made upon the safety of such luxuriousness, and the palatial and luxurious trains are destroyed the same as common ones. By reference to the list of railway accidents and to the causes of same it will be observed that the larger part of said accidents are due to causes that can be averted and prevented by my improvements. It is not proposed to run this safety-train and take extraordinary chances of accident, but to run it safely and as speedily as possible consistent with safety. This is a new departure to provide a safety plan for operating any kind of motor-vehicles, and is particularly adapted to what is called "trunk-line" railway passenger-trains; but this precautionary measure may also be provided on any motor-vehicle, such as locomotive-engines, trolley-cars, horseless carriages, and on freight as well as passenger trains, and while it would be of first importance on through trains running at high speed between large cities for long distances it is believed that owing to the enormous amount of passenger and freight traffic now being done my improvements will become a necessity upon all trains or motor-vehicles of any kind and the loss of human life and destruction of valuable property averted.

What I claim, and desire to secure by Letters Patent, is—

1. In a motor-vehicle, in combination, a position for a general operator, a position for a pilot located independently of said position for the general operator of said motor-vehicle, duplicate means provided for said pilot independent of said general operator to control said motor-vehicle in emergency or otherwise.

2. In a motor-vehicle or locomotive-engine, in combination, a position for a general operator, a position for a pilot for said vehicle or drawn train independent from said position for the general operator, duplicate and superior controlling means for said pilot to control said motor-vehicle independent of said general operator.

3. In a motor-vehicle or locomotive-engine, in combination, a position for a pilot, a position for a general operator, each independent of the other, connecting means between said pilot and said general operator that either may control said motor-vehicle, and signal connection from said pilot to said general operator to advise of pending danger.

4. In a motor-vehicle or locomotive-engine, in combination, a position for a general operator, a position for a pilot independent of said general operator, an adjustable search-light under the control of said pilot and adapted to shed its rays in different directions, up, down or to either side, duplicate, superior and independent means for said pilot to control said motor-vehicle in case of emergency to stop, start or reverse its movement with entire control of said vehicle when necessary.

5. In a motor-vehicle, in combination, a position for a pilot independent of the general operator of said motor-vehicle, an adjustable search-light, means connected with said search-light and extending within reach of said pilot to direct the rays of said light in any direction desired regardless of the direction said motor-vehicle is moving, frictional means to hold said search-light in its adjusted position and provided for instantaneous adjustment by said pilot.

6. In a motor-vehicle, in combination, a position for a general operator, a position for a pilot independent of said general operator, an adjustable search-light, means extending from said pilot to said search-light to direct the rays of said light in any direction desired regardless of the direction said motor-vehicle is moving, frictional means to hold said search-light in any position of adjustment by said pilot.

7. In a motor-vehicle, in combination, duplicate means for controlling said vehicle within the control of both the general operator and pilot of said vehicle, an engaging and disengaging mechanism connecting with the reversing mechanism of the motor and extending within reach of said pilot to disconnect the locking device of said reversing-gear as said general operator may do in the ordinary manner, for the purpose of giving said pilot control of the reversing movement of said motor.

8. In a railway motor-propelled vehicle or locomotive-engine, in combination, a position for a general operator, a position for a pilot located forward of said motor and driving machinery, independent of the position for said general operator on said vehicle, duplicate means provided within reach of said pilot and said general operator, that either may stop, start, reverse, or handle said motor-vehicle and machinery, said pilot acting as a lookout, and in emergency may control said motor-vehicle independently of said general operator.

9. In a motor-vehicle, in combination, a steam-boiler, a position for a general operator, a position for a pilot or lookout for said vehicle forward of the motor-generator or steam-boiler, separate and independent from the general operator, a cab for said pilot located forward of said generator or boiler, doors opening front and rear in said cab to expose said generator or boiler, means provided for said pilot within said cab, independent from said general operator, to control said vehicle in case of emergency or otherwise.

10. In a motor-vehicle, in combination, a position for a general operator on said vehicle, a position for a pilot on said motor-vehicle independent of said motor-vehicle, a signal service that said pilot may warn the general operator of said motor-vehicle or conductor of the train attached to or drawn by said motor-vehicle of approaching trains from front, rear or crosswise of the line of track on which said motor-vehicle is moving.

11. In a motor-vehicle, in combination, a position for a general operator on said vehicle, a position for a pilot located on said vehicle, the position of said general operator especially arranged for the handling of said motor-vehicle and caring for same, the position of said pilot arranged to guard and protect said motor vehicle or train attached thereto from accident or danger, said pilot having means within his control for full manual and superior power to operate and control said motor-vehicle in emergency independently of said general operator.

12. In a motor-vehicle or locomotive-engine, in combination, a general operator, a safety appliance for a pilot stationed for observation of approaching danger forward or rearward or to either side of said vehicle, wholly independent of said general operator, means within the control of said pilot to control said motor-vehicle or locomotive-engine independently of and against the will of said general operator.

13. In a railway propelling-vehicle or locomotive-engine, in combination, a position for a general operator, a position for a pilot of said vehicle forward of said motor and driving machinery independent of said general operator of said vehicle, an air-brake mechanism, a throttle-valve-operating mechanism, a reversing mechanism, controlling means for same located within reach of said pilot and also within reach of said general operator of said motor-vehicle, that either may handle the motor-vehicle to stop, start or change its direction.

14. In a motor-vehicle or drawn train, in combination, a position for a general operator, a position for a pilot in connection with said motor-vehicle, independent of said general operator, duplicate controlling mechanism for operating said motor-vehicle that may be used by said pilot in emergency to avoid accident, communicating means between said pilot and said general operator and occupants of said train, that any or all may be communicated with by said pilot in the event of impending danger, such as attempted train-wrecking, robbery or other difficulties.

15. In a motor-vehicle or locomotive-engine, in combination, a position for a general operator, a position for a pilot independent of the position of said general operator, duplicate means for controlling the movements of said vehicle or locomotive-engine extending within reach of said pilot and said general operator, a connecting mechanism for said controlling means so constructed as to give the pilot superior and supreme control of said motor-vehicle or locomotive-engine in emergency without notice to said general operator and without his concurrent action, that the pilot may in the event of emergency act instantly in handling the movement of the vehicle without the knowledge or consent of said general operator.

In testimony whereof I have hereunto set my hand this 21st day of March, A. D. 1903.

WILLIAM N. WHITELY.

Witnesses:
  JOHN L. GILLIGAN,
  ROBERT WEISKOLTEN.